(12) United States Patent
Verma et al.

(10) Patent No.: US 12,033,047 B2
(45) Date of Patent: Jul. 9, 2024

(54) NON-ITERATIVE FEDERATED LEARNING

(71) Applicant: International Business Machines Corporation, Armonk, NY (US)

(72) Inventors: Dinesh C. Verma, New Castle, NY (US); Supriyo Chakraborty, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 744 days.

(21) Appl. No.: 16/991,120

(22) Filed: Aug. 12, 2020

(65) Prior Publication Data
US 2022/0051146 A1 Feb. 17, 2022

(51) Int. Cl.
  G06N 20/20 (2019.01)
  G06F 18/214 (2023.01)
  G06F 18/25 (2023.01)

(52) U.S. Cl.
  CPC ........... *G06N 20/20* (2019.01); *G06F 18/214* (2023.01); *G06F 18/25* (2023.01)

(58) Field of Classification Search
  CPC ........ G06N 20/20; G06N 3/045; G06N 3/047; G06N 3/063; G06N 3/088; G06N 5/01; G06N 20/00; G06F 18/214; G06F 18/25
  See application file for complete search history.

(56) References Cited

U.S. PATENT DOCUMENTS

| | | | |
|---|---|---|---|
| 2018/0268292 A1* | 9/2018 | Choi | G06V 10/454 |
| 2020/0134446 A1* | 4/2020 | Soni | G06N 3/047 |
| 2020/0151561 A1* | 5/2020 | Kaneko | G06N 3/047 |
| 2020/0301827 A1* | 9/2020 | Mallinson | G06F 12/0292 |

FOREIGN PATENT DOCUMENTS

| | | | |
|---|---|---|---|
| CN | 110428058 A | 11/2019 | |
| CN | 110942154 A | 3/2020 | |
| WO | WO-2021242956 A1 * | 12/2021 | G06N 3/091 |

OTHER PUBLICATIONS

Abadi, M. et al., "Deep Learning with Differential Privacy," Oct. 24-28, 2016, 23rd ACM Conference on Computer and Communications Security, 14 pages.
Dwork, C. et al., "The Algorithmic Foundations of Differential Privacy," 2014, Foundations and Trends in Theoretical Computer Science, vol. 9, Nos. 3-4, pp. 211-407.
Goodfellow, I. et al., "Generative Adversarial Nets," Jun. 10, 2014, Departement d'informatique et de recherche operationnelle, Universite de Montreal, 9 pages.
Guha, N. et al., "One-Shot Federated Learning," arXiv.org preprint, arXiv:1902.11175v2, Mar. 5, 2019, 5 pages.

(Continued)

*Primary Examiner* — Aniss Chad
*Assistant Examiner* — Shien Ming Chou
(74) *Attorney, Agent, or Firm* — CANTOR COLBURN LLP; Jared Chaney

(57) ABSTRACT

Techniques for non-iterative federated learning include receiving local models from agents, generating synthetic datasets for the local models, and producing outputs using the local models and the synthetic datasets. A global model is trained based on the synthetic datasets and the outputs.

8 Claims, 7 Drawing Sheets

(56) References Cited

OTHER PUBLICATIONS

McMahan, H. et al., "Communication Efficient Learning of Deep Networks from Decentralized Data," 2017, vol. 54, Proceedings of the 20th International Conference on Artificial Intelligence and Statistics (AISTATS), 11 pages.
Papernot, N. et al., "Semi-Supervised Knowledge Transfer for Deep Learning from Private Training Data," ICLR 2017, 16 pages.
Shen, T. et al., "Federated Mutual Learning," arXiv.org preprint, arXiv:2006.16765v1, Jun. 27, 2020, 10 pages.
Yurochkin, M. et al., "Bayesian Nonparametric Federated Learning of Neural Networks," May 28, 2019, Proceedings of the 36th International Conference on Machine Learning, 15 pages, arXiv preprint arXiv:1905.12022.

\* cited by examiner

NON-ITERATIVE FEDERATED LEARNING

BACKGROUND

The present invention generally relates to computer systems, and more specifically, computer systems, computer-implemented methods, and computer program products configured to implement non-iterative federated learning.

Machine learning (ML) uses computer algorithms that improve automatically through experience. Machine learning is seen as a subset of artificial intelligence. Machine learning algorithms build a mathematical model based on sample data, known as "training data", in order to make predictions or decisions without being explicitly programmed to do so. Federated learning (also known as collaborative learning) is a machine learning technique that trains an algorithm across multiple decentralized edge devices or servers holding local data samples. This approach stands in contrast to traditional centralized machine learning techniques where all the local datasets (i.e., training data) are uploaded to one server, as well as to more classical decentralized approaches which assume that local data samples are identically distributed. Federated learning enables multiple actors to build a common, robust machine learning model without sharing data, thus allowing the actors to address issues such as data privacy, data security, data access rights, and access to heterogeneous data. However, there can be restrictions in federated learning, and there is a need to provide more flexibility in the federated learning process.

SUMMARY

Embodiments of the present invention are directed to a computer-implemented method of performing non-iterative federated machine learning. A non-limiting example computer-implemented method includes receiving using a processor local models from agents, generating using the processor synthetic datasets for the local models, producing using the processor outputs using the local models and the synthetic datasets, and training a global model based on the synthetic datasets and the outputs.

In addition to one or more of the features described above or below, or as an alternative, further embodiments of the invention could include where each of the local models is associated with one of the synthetic datasets.

In addition to one or more of the features described above or below, or as an alternative, further embodiments of the invention could include where producing the outputs using the local models and the synthetic datasets includes one of the local models generating one of the outputs using one of the synthetic datasets.

In addition to one or more of the features described above or below, or as an alternative, further embodiments of the invention could include where generating the synthetic datasets for the local models includes using one of the local models to generate an associated one of the synthetic datasets, the one of the local models having functionality of a generator model.

In addition to one or more of the features described above or below, or as an alternative, further embodiments of the invention could include where generating the synthetic datasets for the local models includes using one or more generator models to generate one or more of the synthetic datasets.

In addition to one or more of the features described above or below, or as an alternative, further embodiments of the invention could include receiving at least one generator model associated with at least one of the local models, the at least one of the local models having been previously trained on a local dataset for the at least one of the local models, the at least one generator model being configured to generate at least one of the synthetic datasets comparable to the local dataset.

In addition to one or more of the features described above or below, or as an alternative, further embodiments of the invention could include where the synthetic datasets are statistically comparable to local datasets previously used to train the local models.

In addition to one or more of the features described above or below, or as an alternative, further embodiments of the invention could include transmitting a global model to each of the agents according to a type of model architecture requested by the agents.

In addition to one or more of the features described above or below, or as an alternative, further embodiments of the invention could include where the training the global model based on the synthetic datasets and the outputs enable unilaterally provisioning computing capabilities for fusion services.

In addition to one or more of the features described above or below, or as an alternative, further embodiments of the invention remove the need for model updates to be synchronized, thereby allowing flexible updates to the global model even when one or more agents withdraw their participation from the federated learning process.

In addition to one or more of the features described above or below, or as an alternative, further embodiments of the invention include allowing the global model to have any model architecture desired by the agents, thereby providing more flexibility in the federated learning process.

Other embodiments of the invention of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
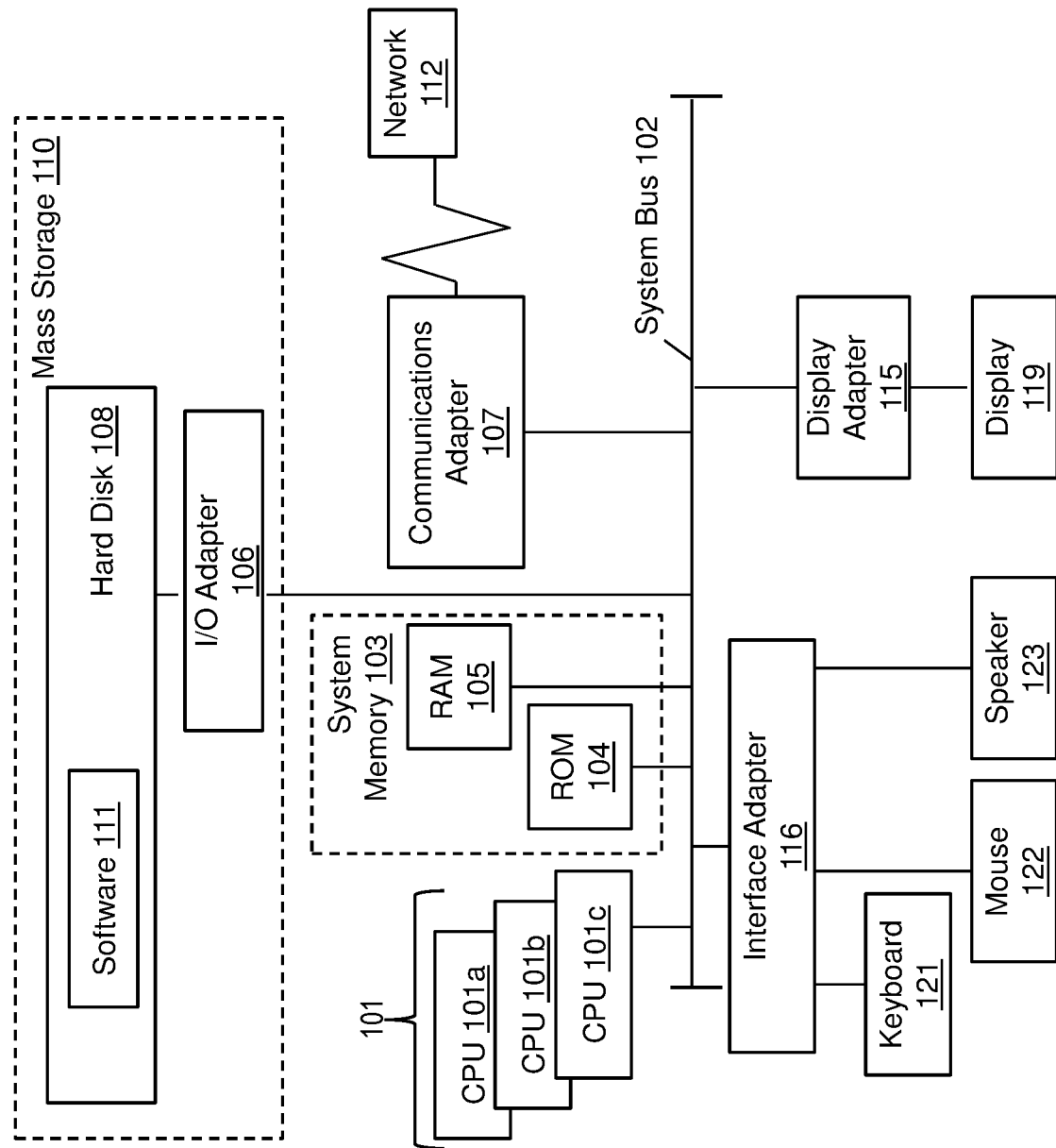
FIG. 1 depicts a block diagram of an example computer system for use in conjunction with one or more embodiments of the present invention.

One or more embodiments of the present invention provide computer systems, computer-implemented methods, and computer program products configured and arranged to implement a non-iterative federation of local models to generate a global model. In one or more embodiments of the invention, the global model is trained at the computer system (e.g., server), instead of being the output of any traditional fusion process. It should be appreciated that any local model can be conceptualized as a lossy/compressed representation of the training data distribution and can be decompressed to generate a synthetic dataset sampled from the same (original) distribution. This representative synthetic dataset for every local site or agent can be collated together as training data for the global model at the computer system, in accordance with one or more embodiments of the invention.

Federated learning is a popular paradigm for private and distributed machine learning. In this setting, models are trained locally using data at the various agents, and model parameters alone are shared with a central server. The server in turns performs fusion of parameters in an attempt to compute a global model. The process is repeated over multiple rounds until convergence of the global model is achieved. Iteration is required in this process, and the reason is for iterative adjustment of the weights which allows the agents to fine-tune the global model to their own dataset; this is an attempt to balance between generalization over the population scale distribution (from which all agent data partitions are derived) and accuracy over the local dataset of each agent. However, there are drawbacks associated with the iterative approach and parameter fusion. Particularly, there is often a need to synchronize the updates from the various agents. Practical approaches to addressing the presence of stragglers (agents which are relatively slow in sending their updates to the server) include setting up a timeout interval for a round. Upon expiration of the timeout, only the updates already received are used for fusion and others are ignored. One can also set a corresponding threshold for the smallest number of updates required for fusion to be feasible. If the number of updates is smaller than the set threshold, then the fusion operation is no longer performed for that round. These issues can slow down convergence and reduce the quality of the global model. Alternately, asynchronous fusion strategies lead to creation of multiple global models each having different updates to accommodate various delays in the update process. Movement of the base global model (due to incremental fusion) can lead to error accumulation in the global model. Furthermore, asynchronous fusion is not an attractive strategy from a practical standpoint, requiring state maintenance at the server and possibly the agents. Finally, iterative fusion via averaging of weights implicitly assumes homogeneity in model architecture, which can also be restrictive depending on the application use case.

However, non-iterative federation of local models to generate a global model avoids such issues and challenges according to one or more embodiments of the invention. In one or more embodiments of the invention, a computer system (which could be a server) providing the fusion service can ask each site to provide two types of models, the trained local model (e.g., a classifier) and a generator model. The generator model is requested in cases where the local model is not already a generator model. If the local model can also function as a generator model, then a separate generator model does not have to be utilized/requested. The generator model enables the computer system at the fusion site to recreate a dataset that is like the original training dataset which was at the original local site. This recreated dataset can be referred to as a synthetic dataset. Once the fusion service of computer system uses the generator model to generate a statistically similar dataset (i.e., synthetic dataset), computer system uses the trained local model from the site to classify the generated dataset into an appropriate class. After each local model has been used to classify the generated dataset (i.e., synthetic dataset), the computer system uses all the generated data from all participating sites to train a new model (i.e., global model). The new model can belong to any model architecture, which can be different for each participating site. If a site decides to withdraw from participation in the fusion service, the computer system can delete the generator model and local model for the withdrawn site, and then regenerate the data and train new global models for all of the other participating sites, to be updated by the fusion site when the local sites request a refresh.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments of the invention, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments of the invention described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
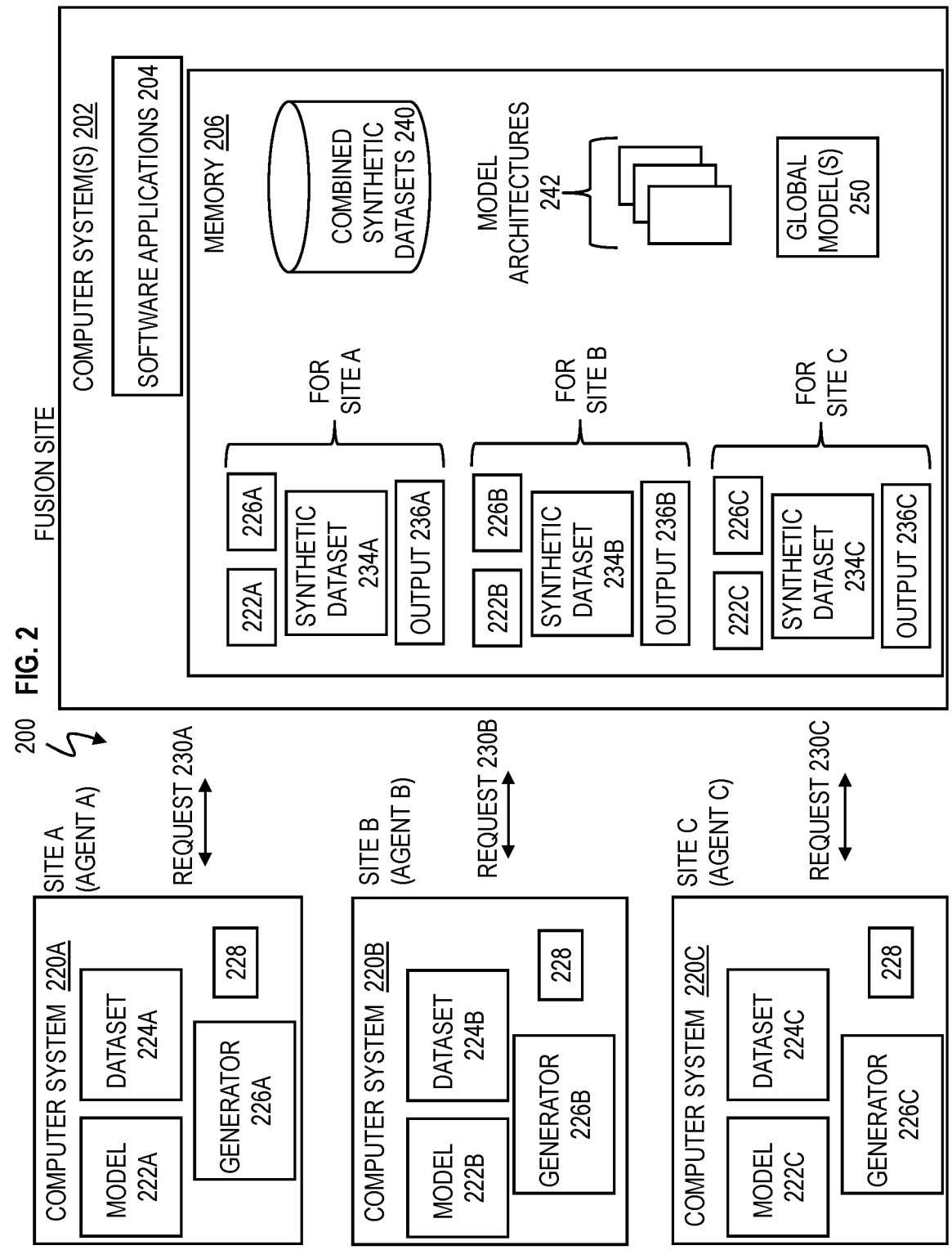
FIG. 2 depicts a block diagram of a system for non-iterative federated learning in accordance with one or more embodiments of the present invention.
Figure 3:
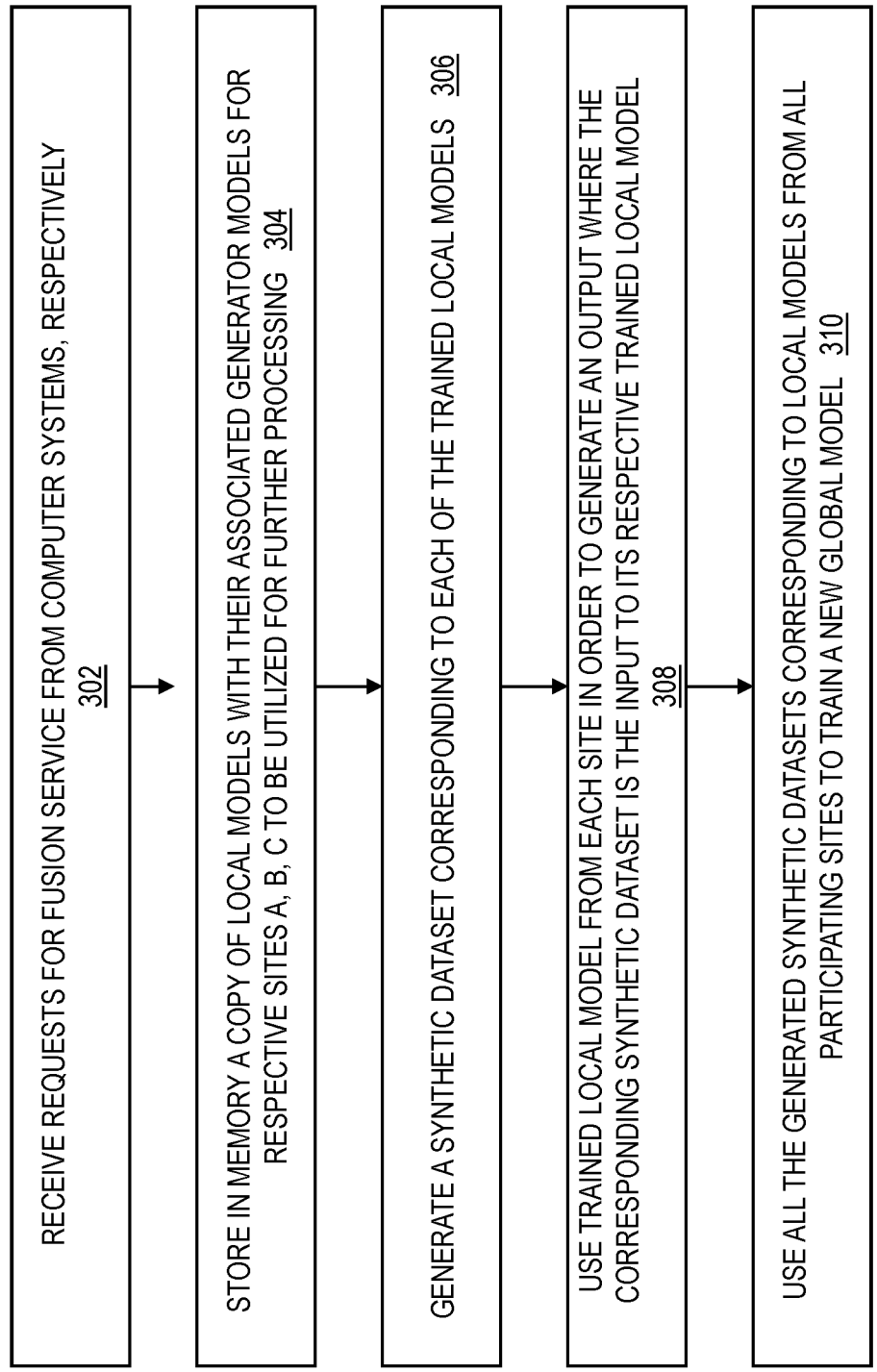
FIG. 3 depicts a flowchart of a process for non-iterative federated learning using local models to generate a global model in accordance with one or more embodiments of the present invention.

FIG. 2 is a block diagram of a system 200 for non-iterative federated learning using local models to generate a global model 150 in accordance with one or more embodiments of the present invention. FIG. 2 depicts one or more computers systems 202 coupled to various computer systems at different sites. The various computer systems include computer system 220A at site A, computer system 220B at site B, computer system 220C at site C, and so forth. Each local site can be a datacenter. Computer systems 220A, 220B, 220C can be generally referred to as computer systems 220. Although three computer systems 220 are shown for illustration purposes, more or fewer than three computer systems 220 can be coupled to computer system 202. Computer systems 202 can be representative of numerous computers in datacenters at the fusion site. Computer system 220 can be representative of numerous computers and/or agents requesting fusion services from computer systems 202. Elements of computer system 100 can be used in and/or integrated into computers system 202 and computer systems 220. FIG. 3 depicts a flowchart of a process 300 for non-iterative federated learning using local models to generate a global model in accordance with one or more embodiments of the present invention. Process 300 in FIG. 3 will be described with reference to FIG. 2.

At block 302, software application 204 on computer system 202 is configured to receive requests 230A, 230B, 230C for fusion service from computer systems 220A, 220B, 220C, respectively. Requests 230A, 230B, 230C can generally be referred to as requests 230. Each of the requests 230 can include a trained local model (e.g., classifier) and a generator model in case the local model is not already a generator model. For example, computer system 220A at site A can send its trained local model 222A, which has been trained using training dataset 224A, along with generator model 226A to computer system 202. Similarly, computer system 220B at site B can send its trained local model 222B, which has been trained using training dataset 224B, along with generator model 226B to computer system 202. Computer system 220C at site C can send its trained local model 222C, which has been trained using training dataset 224C, along with generator model 226C to computer system 202. Additionally, each request 230 can include the type of model architecture being requested and a unique identification (ID) such as a numeric ID, alphanumeric ID, a unique name, etc., which uniquely identifies the site from other sites. Trained local models 222A, 222B, 222C can generally be referred to as trained local models 222. Generator models 226A, 226B, 226C can generally be referred to as generator models 226. Although generator models 226A, 226B, 226C are shown for each site A, B, C, it is noted that one or more request 230 may not include a generator model 226 along with the local model 222 because the local model 222 itself is configured to operate as a generator model in one or more embodiments of the invention. Also, there can be more than one generator model 226 associated with and sent along with a single local model 222 for a request 230 in one or more embodiments of the invention.

Computer systems 220 and/or the sites can also be referred to as the customer, tenant, agent, etc. Computer system 220 can communicate with computer systems 202 over a wired and/or wireless network. Using computer system 220, the user can interface directly with software application 204 of computer system 202 and/or use a client application 228 to interface with software application 204. Software application 204 can be implemented as software 111 executed on one or more processors 101, as discussed in FIG. 1. Similarly, client application 228 can be implemented using software 111 configured to execute on one or more processors 101. Client application 228 can include cookies, plug-ins, application programming interfaces (APIs), etc., and client application 228 can serve as a piece of computer software that accesses the fusion services made available by computer system 202.

At block 304, software application 204 on computer system 202 is configured to store in memory 206 a copy of local models 222A, 222B, 222C with their associated generator models 226A, 226B, 226C for respective sites A, B, C to be utilized for further processing. At block 306, software application 204 on computer system 202 is configured to generate a synthetic dataset corresponding to each of the trained local models 222. For example, software application 204 on computer system 202 is configured to use generator model 226A to generate synthetic dataset 234A statistically representative of and/or equivalent to training dataset 224A previously used to train local model 222A, all of which can be stored in a memory space dedicated to site A in memory 206. Similarly, software application 204 on computer system 202 is configured to use generator model 226B to generate synthetic dataset 234B statistically representative of and/or equivalent to training dataset 224B previously used to train local model 222B, all of which can be stored in a memory space dedicated to site B in memory 206. Software application 204 on computer system 202 is configured to use generator model 226C to generate synthetic dataset 234C statistically representative of and/or equivalent to training dataset 224C previously used to train local model 222C, all of which can be stored in a memory space dedicated to site C in memory 206. Synthetic datasets 234A, 234B, 234C can be generally referred to as synthetic datasets 234. Local datasets 224 and synthetic datasets 234 can each include numerous pieces of data in any desired format. Datasets 224 and synthetic datasets 234 can each contain hundreds, thousands, and/or millions of pieces of data, also referred to as "big data". In accordance with one or more embodiments of the invention, the enormous size of any of datasets 224 and synthetic datasets 234 requires management, processing, and search by a machine (such as computer system 202), for example, using computer-executable instructions, and could not be practically managed, stored, analyzed, and/or processed as discussed herein within the human mind.

At block 308, software application 204 on computer system 202 is configured to use trained local model 222 from each site in order to generate an output where the corresponding synthetic dataset 234 is the input to its respective trained local model 222. For example, trained local model 222A receives synthetic dataset 234A as input and generates output 236A. Similarly, trained local model 222B receives synthetic dataset 234B as input and generates output 236B. Likewise, trained local model 222C receives synthetic dataset 234C as input and generates output 236C. Outputs 236A, 236B, 236C can generally be referred to as outputs 236. The outputs 236 are labeled data that are used to train the global model.

At block 310, software application 204 on computer system 202 is configured to use all the generated synthetic datasets corresponding to trained local models 222 from all participating sites to train a new global model 250. Software application 204 can collect synthetic datasets 234A, 234B, 234C and their respective outputs 236A, 236B, 236C in combined synthetic dataset 240, and/or can request synthetic datasets 234A, 234B, 234C and their respective outputs 236A, 236B, 236C individually when training global model 250. For example, combined synthetic dataset 240 is a labeled dataset representing each of synthetic datasets 234A, 234B, 234C. Software application 204 is configured to train global model 250. The global model 250 can belong to any model architecture, which can be different for each participant site, different for some sites and the same for other sites, and/or any combination thereof. At block 312, software application 204 on computer system 202 is configured to transmit the desired global model 250 to each computer system 220 at each site A, B, C in the desired model architecture which was previously requested by respective computer systems 220, thereby providing fusion services.

Software application 204 can select the model architecture for global model 250 from a variety of model architectures 242 to fulfill the requested type of model architecture for each site A, B, C. By default, the global model 250 can have the same model architecture as one of the local models 222A, 222B, 222C. In one or more embodiments of the invention, when the computers systems 220A, 220B, 220C each request different model architectures for the global model 250, software application 204 is configured to perform block 312 for one type of model architecture, repeat block 312 for another type of model architecture, and so forth until global models 250 are created for each type of model architecture requested in requests 230A, 230B, 230C. It is noted that trained local models 222A, 222B, 222C respectively on computer systems 220A, 220B, 220C at site A, B, C have the same objective, and likewise global models 250 have the same objective as local models 222A, 222B, 222C. For example, local models 222A, 222B, 222C at sites A, B, C have the same predictor and are attempting to classify the same type of information. In an example scenario, sites A, B, C could be different entities (e.g., banks) using local models 222A, 222B, 222C on computer systems 220A, 220B, 220B, respectively, to classify loan data in their respective local datasets 224A, 224B, 224C. Model architectures 242 include their associated machine learning algorithms to generate the desired type of model architecture. Examples of model architectures 242 include but are not limited to linear regression, logistic regression, linear discriminant analysis, decision trees, Naive Bayes, k-nearest neighbors, learning vector quantization, support vector machines, bagging and random forest, deep neural networks, etc.

In one or more embodiments of the invention, the functionality of software applications 204 can be implemented by configuring and arranging the processing system 100 to execute machine learning algorithms. In general, machine learning algorithms, in effect, extract features from received data in order to "classify" the received data. Examples of suitable classifiers include but are not limited to neural networks (described in greater detail below), support vector machines, logistic regression, decision trees, hidden Markov Models (HMMs), etc. The result of the classifier's operations, i.e., the "classification," is to predict a class for the data. The machine learning algorithms apply machine learning techniques to the received data in order to, over time, create/train/update a unique "model" (i.e., global model 250). The learning or training performed by the classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments of the invention where the engines/classifiers are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to system 200 can be implemented using the processing system 100.

There are many technical benefits and advantages of the fusion service discussed herein. If a local site decides to withdraw from participation, the fusion service provided by computer system 202 is configured to delete its generator and local model, regenerate the combined synthetic datasets 240, and train new global models 250 for all of the other participating sites, to be updated when the sites ask the fusion service for a refresh. Using both the generator technology and classification of training data, this unique combination is used to create model fusion which offers flexibility of architecture choice, the ability to withdraw from the fusion service, and eliminates synchronization, thereby overcoming many challenges. Further, one or more embodiments of the invention do not require local models 222 to have the same and/or similar model architectures. Rather, each local model can have different model architectures. The individual local datasets 224 can each be terabytes or larger in size, and the fusion service in embodiments of the invention do not require local datasets 224 to be transmitted from respective sites (i.e., computer systems 220) to computer system 202 because computer system 202 has the means to generate synthetic datasets 234. The size of local models 222 and generator models 226 is much smaller compared to individual local datasets 224.

As further technical advantages and benefits, a local model can be viewed as a compact representation of the data that it was trained on, and the local model can be used to recreate equivalent training data (i.e., synthetic datasets) according to one or more embodiments of the invention. Computer system 202 uses the received local models 222 from the sites to synthesize training data which can be used to train the global model. With respect to synthetic datasets, there can several scenarios: (i) one or more local models 222 received from the sites are generator models; (ii) one or more local models 222 are not generative but meta-information about the training data domain is known and can be used to sample points from the domain; and (iii) one or more local models 222 are not generative and no domain information is known. In scenario (i), the generator model can be used to generate synthetic samples representative of the local dataset distribution (e.g., of a local dataset 224) and train the global model 250. In scenario (ii), if sites provide sufficient meta information about their training data domain, computer system 202 can use the information to sample points from the domain. Computer system 202 can then use the provided local model 222 (e.g., a classifier) to label the set of data points sampled from the domain. The labeled dataset can now be used to train the global model 250. Further, in scenario (iii), if there is no information about the training data domain and the shared local model 222 is not generative, computer system 202 can request an auxiliary private generator model from the sites. Now, the auxiliary model can be used to synthesize samples to train the global model 250.

As further technical advantages and benefits, it should be recognized that one or more embodiments of the invention remove dependency on homogeneity of model architectures. If the received local models together with the accompanying metadata can be leveraged to generate synthetic data (representative of the local data distributions), computer system 202 can use the synthetic data to train the global model at the fusion site, even when the model architectures of the individual models and the global model are all different.

As additional technical advantages and benefits, one or more embodiments of the invention can remove the need for model updates to be synchronized. Whenever model updates arrive, computer system 202 can incrementally synthesize data (e.g., add to the combined synthetic datasets 240), use the data to retrain the global model, and push the updated global model back to all the sites/agents. When training the global model, computer system 202 uses outputs 236 generated from all the received local models 222, along with the combined synthetic datasets 240, thereby ensuring that the global model 250 is up-to-date.

In accordance with one or more embodiments of the invention, sites/agents can not only send their trained local models 222 but also provide meta information identifying the type of local model 222, information about the training data domain (e.g., description and range of the feature space) of the local dataset 224, and so on. For example, if the local model 222 is a generator for a generative adversarial network (GAN), the metadata can include the model weights and the parameters of the noise distribution (e.g., mean and variance of a Gaussian distribution) used to generate new samples (i.e., to therefore generate synthetic dataset 234).

Now turning to further details regarding generator models which is discussed below. For explanation, it is assumed that one of the local models 222 is a decision tree model. Decision trees are not generator models, and therefore a generator model would be utilized by computer system 202 in conjunction with the example decision tree model. There are various generator models. For data in local datasets 224 with features most common in the context of enterprises, a few different types of generator models are discussed below that can be utilized with one or more local models 222 that might not be generators themselves (i.e., a decision tree). As a first type of generator model, the generator model is configured to map all features, categorical attributes of the data, to their principal components on a per class basis. These principal components together with their maximum and minimum values form the generator model for a class. The computer system 200 (e.g., server) draws random samples from the principal components' minimum and maximum ranges and uses the sampled values to train a global model. This generator model is sent to the computer system 202 (e.g., fusion site) as the minimum and maximum of each feature along with a principal component analysis (PCA) matrix. As a second type of generator model, the generator model is configured to determine the covariance matrix among all features and generate random normal distributions with mean and standard deviation of each feature. This generator model can be sent to computer system 202 (e.g., fusion site) as the covariance matrix along with the mean and standard deviation of each feature. The third type of generator model can include covariance statistics on a per class basis and/or per output label basis.

Figure 4:
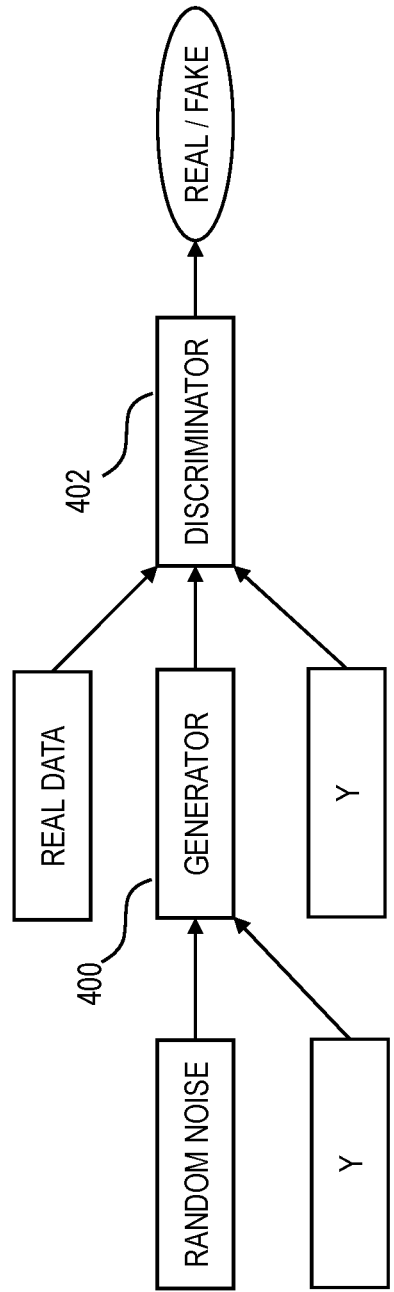
FIG. 4 depicts a block diagram of an example generative adversarial network (GAN) in accordance with one or more embodiments of the present invention.

For other types of data in local datasets 224, other types of generator models can also be used. For example, GAN can be a generator model used, e.g., with images. GANs can be utilized to regenerate similar images as the original images in the local datasets 224. GANs can be customized and validated for each set of images, although GANs might be less frequently used in enterprise applications than other types of generator models. As an additional option for generator models used with images (or image data), clustering can also be used. FIG. 4 depicts a block diagram of an example GAN according to one or more embodiments of the invention. The GAN generator model 400 is an example generator for image datasets (e.g., local dataset 224). Typically, generator architectures used in GANs synthesize images which need to be labeled using another classifier model. To support one-shot federation, FIG. 4 depicts the use a conditional GAN architecture, where the GAN generator model 400 (e.g., generator) is conditioned on additional information, e.g., label of the image. During training, the GAN generator model 400 receives as input random noise and Y as the one-hot encoded label of the image class. A one-hot encoding of a label is a binary vector which contains a single '1' corresponding to the label being encoded and all other fields in the vector are set to zero. The size of the vector corresponds to the number of possible labels. The position of the '1' in the encoding identifies a label uniquely. The GAN generator model 400 is configured to create an image. A discriminator 402 acts as the judge and evaluates whether the created image is real or fake using real image data. After training is complete, the GAN generator model 400 can be utilized to generate images which match images in the real image data.

An example scenario of non-iterative federation using decision trees is provided below for illustration purposes and not limitation. It is assumed that there are two agents/sites with datasets $D_1$ and $D_2$. Let $[f_1, f_2, \ldots, f_k]$ be the feature set extracted from $D_1$ and $D_2$. The domain space of each feature is defined as $f_i \in [r_i^{min}, r_i^{max}]$. It is assumed that in addition to the decision trees, the feature space and the domain information is shared with computer system 202. Let $T_1$ and $T_2$ denote the decision trees respectively. The following operations occur.

Operation 1: computer system 202 takes each of the decision trees and for each leaf node creates a decision box. A decision box (DB) is defined by k iso-parallel lines each line corresponding to a constraint on one of the features. Let $DB_1$ and $DB_2$ denote the set of decision boxes for trees $T_1$ and $T_2$ respectively.

Operation 2: The intersection between the decision boxes generated for each tree is computed. All conflicts (e.g., regions of the domain which have a label mismatch between the trees) are resolved. Let the set of boxes be denoted by IB.

Operation 3: For each of the decision boxes in the set IB, computer system 202 samples points. Each point is k-dimensional corresponding to value of each of the features. The sample points satisfy the constraints of the decision box.

Operation 4: The sampled points are used to train a new decision tree. This decision tree reflects the constraints of the decision boxes which correspond to the merged trees. The trained tree is the global model 250 corresponding to the merging of the decision trees.

Figure 5:
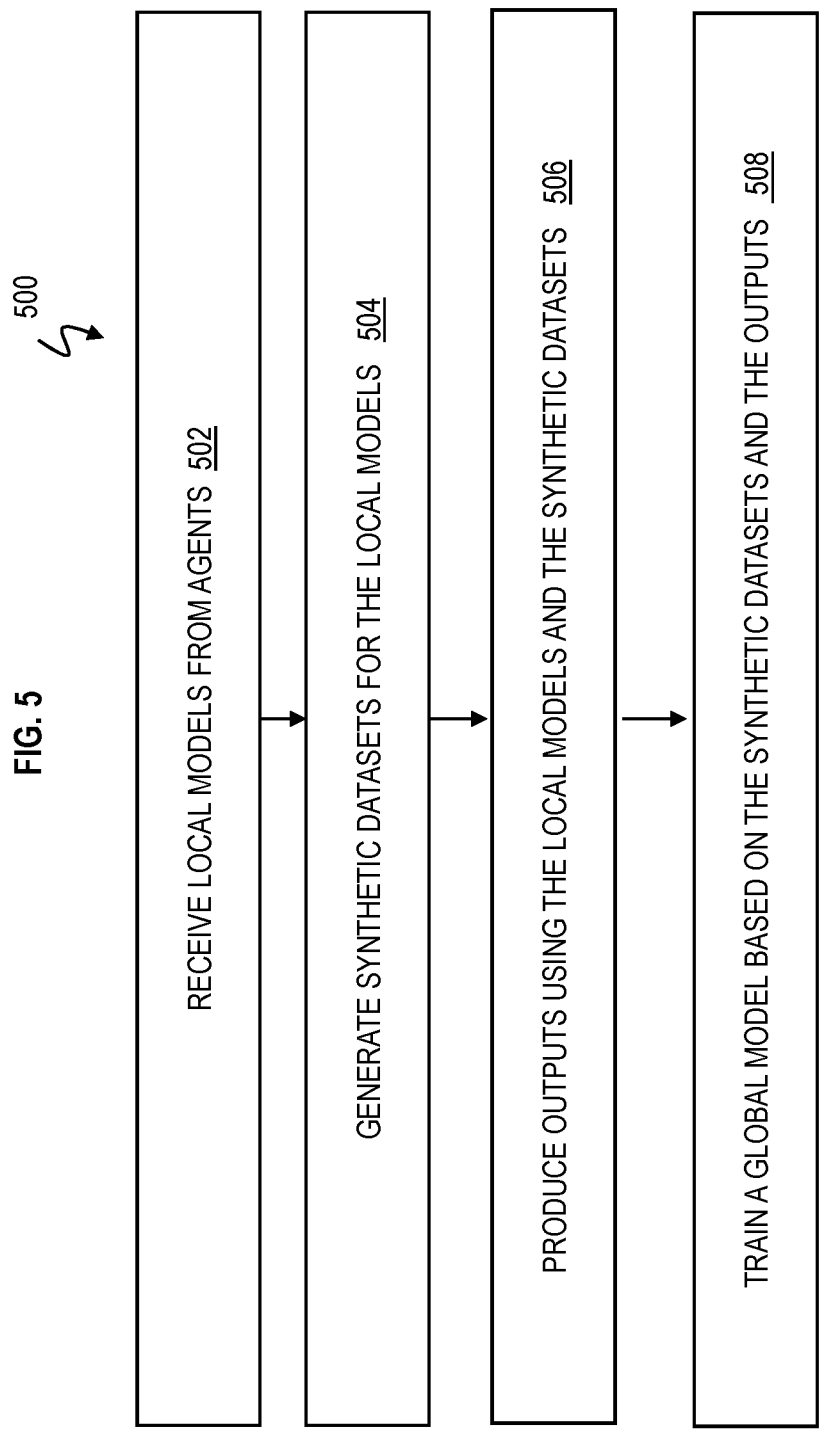
FIG. 5 depicts a flowchart of a computer-implemented method for non-iterative federated learning in accordance with one or more embodiments of the present invention.

FIG. 5 is a flowchart of a computer-implemented method 500 for non-iterative federated learning in accordance with one or more embodiments of the present invention. At block 502, software application 204 of computer system 202 is configured to receive local models 222A, 222B, 222C from agents (e.g., computer systems 220 at sites A, B, C). At block 504, software application 204 of computer system 202 is configured to generate synthetic datasets 234A, 234B, 234C for the local models 222A, 222B, 222C. At block 506, software application 204 of computer system 202 is configured to produce outputs 236A, 236B, 236C using the local models 222A, 222B, 222C and the synthetic datasets 234A, 234B, 234C (or combined synthetic datasets 240). At block 508, software application 204 of computer system 202 is configured to train a global model 250 based on the synthetic datasets 234A, 234B, 234C and the outputs 236A, 236B, 236C.

Each of the local models 222A, 222B, 222C is associated with one of the synthetic datasets 234A, 234B, 234C, respectively. Producing the outputs 236 using the local models 222 and the synthetic datasets 234 includes one of the local models 222 generating one of the outputs 236 using one of the synthetic datasets 234 (e.g., local model 222A can generate output 236A using its synthetic dataset 234A). Generating the synthetic datasets 234 for the local models 222 includes using one of the local models 222 to generate an associated one of the synthetic datasets 234, the one of the local models 222 having functionality of a generator model. Generating the synthetic datasets 234 for the local models 222 includes using one or more generator models 226 to generate one or more of the synthetic datasets 234 (e.g., generator model 226A can generate synthetic dataset 234A).

Software application 204 on computer system 202 is configured to receive at least one generator model 226 associated with at least one of the local models 222, the at least one of the local models 222 having been previously trained on a local dataset 224 for the at least one of the local models 222, the at least one generator model 226 being configured to generate at least one of the synthetic datasets 234 comparable to the local dataset 224 (e.g., generator model 226A can generate at least synthetic dataset 234A comparable to the local dataset 224A). Synthetic datasets 234 are statistically comparable to local datasets 224 previously used to train the local models 222 (e.g., synthetic dataset 234A is statistically comparable to local dataset 224A previously used to train the local model 222A). Software application 204 on computer system 202 is configured to transmit a global model 250 to each of the agents (e.g., computer system 220 at respective sites A, B, C) according to a type of model architecture requested by the agents. Training the global model 250 based on the synthetic datasets 234 and the outputs 236 enable unilaterally provisioning computing capabilities for fusion services.

In one or more embodiments of the invention, non-iterative federation learning (i.e., fusion services) can be implemented on the processing system 100 found in FIG. 1. The processing operations described with reference to the elements of FIGS. 3, 4, and 5 can be performed utilizing the processing system 100 in FIG. 1. Additionally, a cloud computing node 10 can be in wired or wireless electronic communication with one or all the elements of the system 200, and/or the cloud computing node 10 can implement one or more elements of the system 200. Cloud 50 (discussed below) can supplement, support or replace some or all the functionality of the elements of the system 200. Additionally, some or all the functionality of the elements of system 200 can be implemented as a node 10 (shown in FIGS. 6 and 7) of cloud 50. Cloud computing node 10 is only one example of a suitable cloud computing node and is not intended to suggest any limitation as to the scope of use or functionality of embodiments of the invention described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
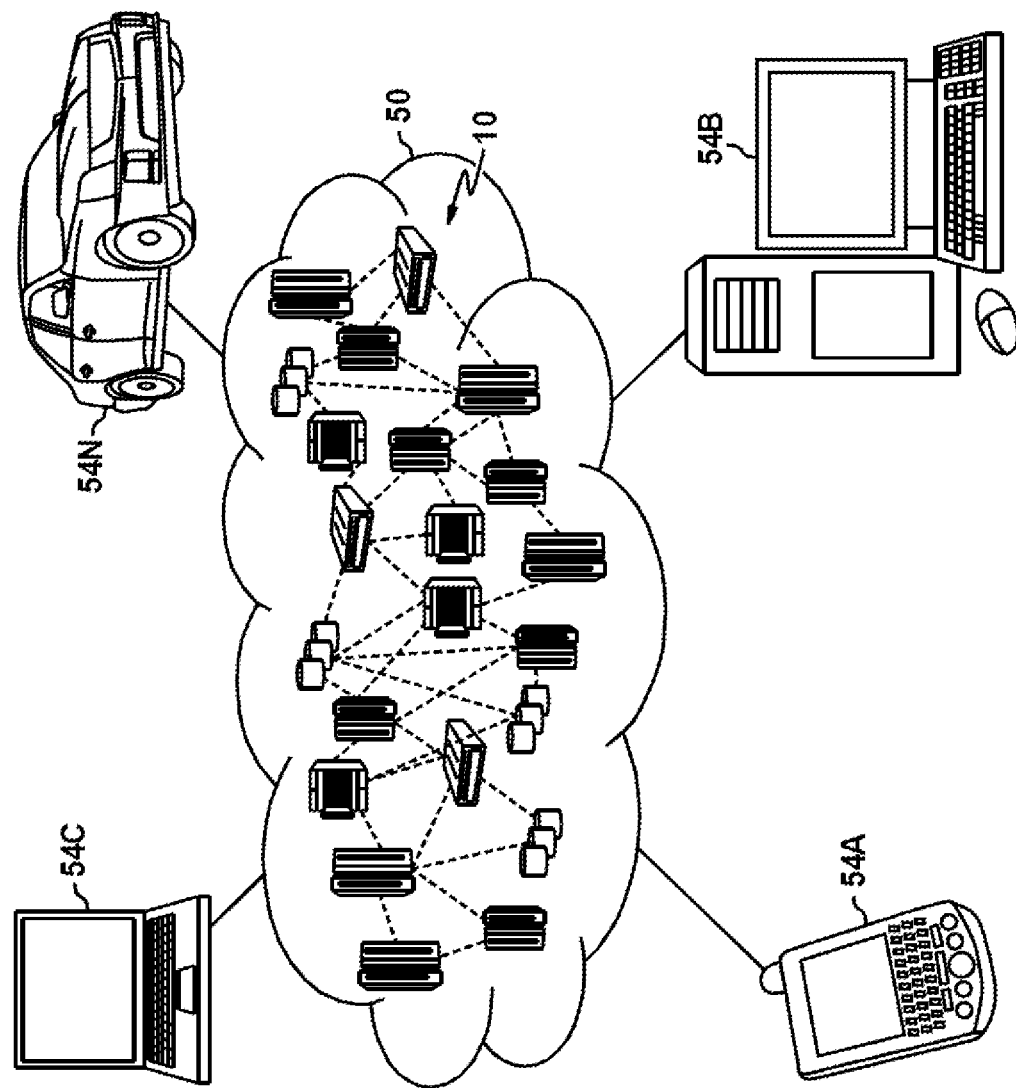
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
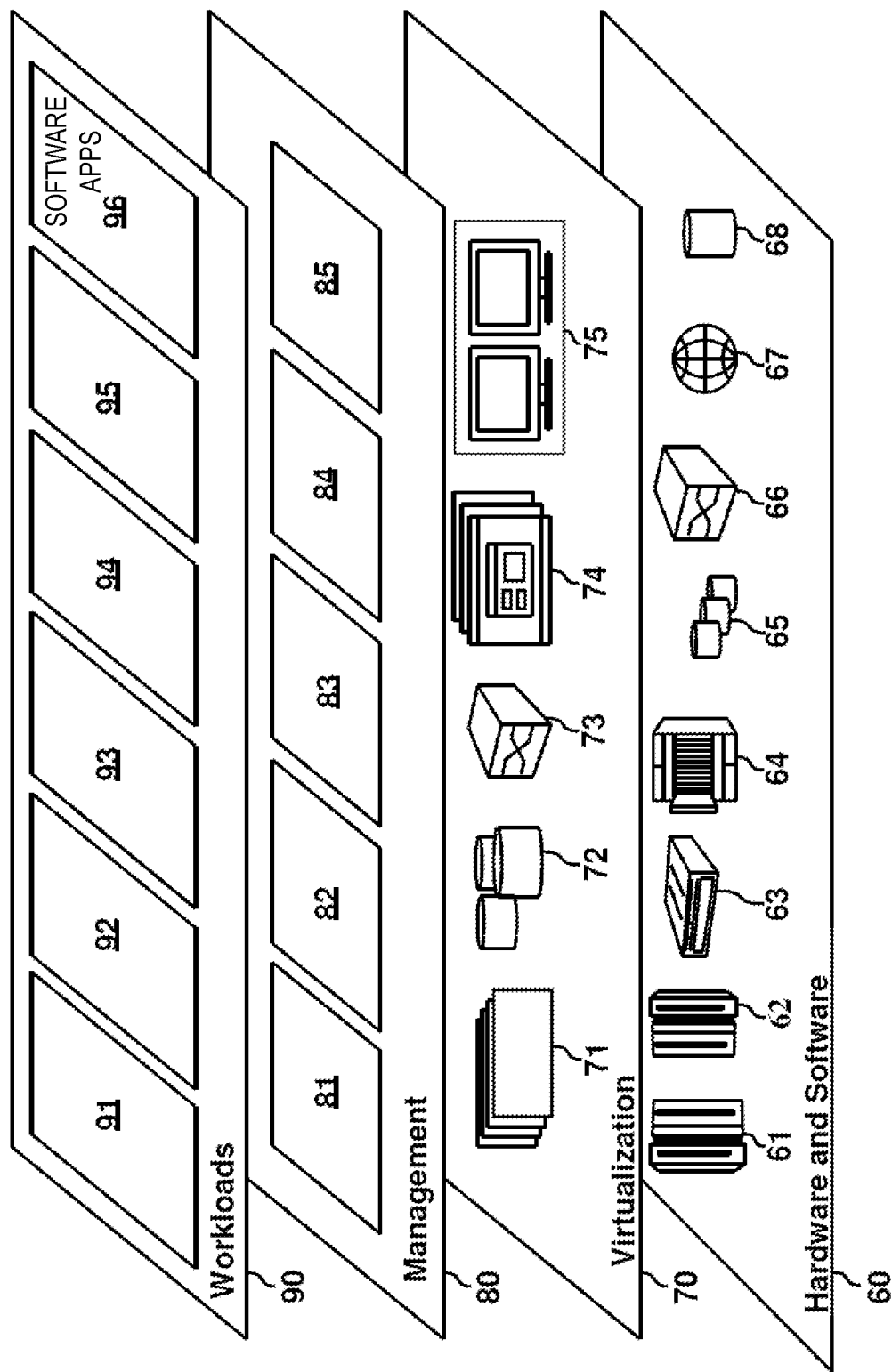
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications implemented in workloads and functions 96 (e.g., executing software applications 204 along with training the global models 250 and executing copies of local models 222 and generator models 226). Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, using a processor at a first site, local models from agents at remote sites, the local models including a first local model associated with a first generator model from a first remote site and a second local model associated with a second generator model from a second remote site, wherein the first local model and the first generator model were created at the first remote site, wherein the second local model and the second generator model were created at the second remote site;
   preparing, by the processor, training data for a global model at the first site, the preparing training data comprising:
      operating, using the processor, the first and second generator models to generate first and second synthetic datasets respectively for the first and second local models at the first site; and
      operating, by the processor, the first local model having been created and received from the first remote site to generate a first output that labels the first synthetic dataset generated by the first generator model created and received from the first remote site in response to inputting the first synthetic dataset;
      operating, by the processor, the second local model having been created and received from the second remote site to generate a second output that labels the second synthetic dataset generated by the second generator model created and received from the second remote site in response to inputting the second synthetic dataset, wherein the training data comprises the first output labeling the first synthetic dataset and the second output labeling the second synthetic dataset; and
   training the global model with the training data comprising the first output labeling the first synthetic dataset and the second output labeling the second synthetic dataset.

2. The computer-implemented method of claim 1, wherein the first and second synthetic datasets are statistically comparable to local datasets previously used to train the first and second local models.

3. The computer-implemented method of claim 1 further comprising transmitting the global model to each of the agents according to a type of model architecture requested by the agents.

4. The computer-implemented method of claim 1, wherein the training the global model based on the first and second synthetic datasets and the first and second outputs enable unilaterally provisioning computing capabilities for fusion services.

5. A system comprising:
   a memory having computer readable instructions; and
   one or more processors at a first site for executing the computer readable instructions, the computer readable instructions controlling the one or more processors to perform operations comprising:
      receiving local models from agents at remote sites, the local models including a first local model associated with a first generator model from a first remote site and a second local model associated with a second generator model from a second remote site, wherein the first local model and the first generator model were created at the first remote site, wherein the second local model and the second generator model were created at the second remote site;
      preparing training data for a global model at the first site, the preparing training data comprising:
         operating the first and second generator models to generate first and second synthetic datasets respectively for the first and second local models at the first site;
         operating the first local model having been created and received from the first remote site to generate a first output that labels the first synthetic dataset generated by the first generator model created and received from the first remote site in response to inputting the first synthetic dataset
         operating the second local model having been created and received from the second remote site to generate a second output that labels the second synthetic dataset generated by the second generator model created and received from the second remote site in response to inputting the second synthetic dataset, wherein the training data comprises the first output labeling the first synthetic dataset and the second output labeling the second synthetic dataset; and training the global model with the training data comprising the first output labeling the first synthetic dataset and the second output labeling the second synthetic dataset.

6. The system of claim 5, wherein the first and second local models have been previously trained on a local dataset.

7. The system of claim 5 further comprising transmitting the global model to each of the agents according to a type of model architecture requested by the agents, wherein the first and second synthetic datasets are statistically comparable to local datasets previously used to train the first and second local models.

8. A computer program product comprising a computer readable storage medium having program instructions embodied therewith, the program instructions executable by a processor at a first site to cause the processor to perform operations comprising:
receiving local models from agents at remote sites, the local models including a first local model associated with a first generator model from a first remote site and a second local model associated with a second generator model from a second remote site, wherein the first local model and the first generator model were created at the first remote site, wherein the second local model and the second generator model were created at the second remote site;
preparing training data for a global model at the first site, the preparing training data comprising:
operating the first and second generator models to generate first and second synthetic datasets respectively for the first and second local models at the first site; and
operating the first local model having been created and received from the first remote site to generate a first output that labels the first synthetic dataset generated by the first generator model created and received from the first remote site in response to inputting the first synthetic dataset; and
operating the second local model having been created and received from the second remote site to generate a second output that labels the second synthetic dataset generated by the second generator model created and received from the second remote site in response to inputting the second synthetic dataset, wherein the training data comprises the first output labeling the first synthetic dataset and the second output labeling the second synthetic dataset; and
training the global model with the training data comprising the first output labeling the first synthetic dataset and the second output labeling the second synthetic dataset.

* * * * *